Oct. 27, 1931.  J. A. McGEORGE  1,829,101
CONNECTION FOR PIPES, TUBES, BARS, AND THE LIKE
Filed May 18, 1929
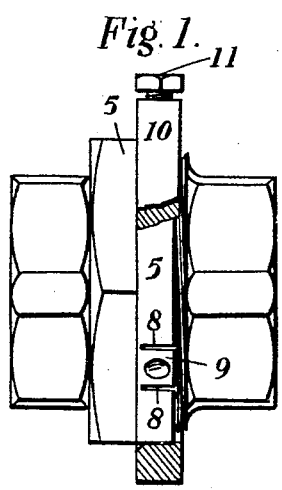
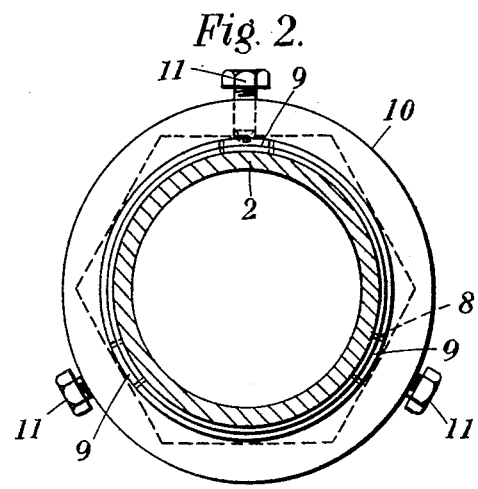
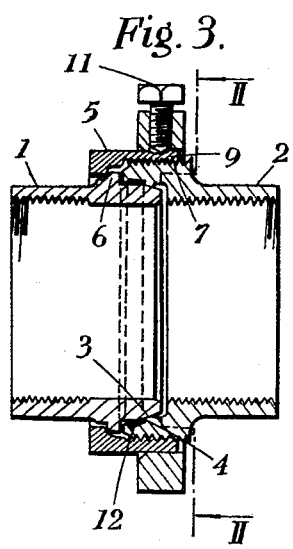
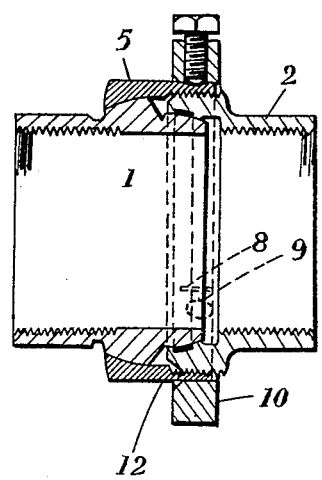
INVENTOR
J. A. McGEORGE
BY
ATTORNEY Patented Oct. 27, 1931

1,829,101

UNITED STATES PATENT OFFICE

JAMES AUGUST McGEORGE, OF NEW CROSS, LONDON, ENGLAND, ASSIGNOR TO THE LONDON VALVE COMPANY, LIMITED, OF GREAT BRIDGE, STAFFORDSHIRE, ENGLAND

CONNECTION FOR PIPES, TUBES, BARS, AND THE LIKE

Application filed May 18, 1929, Serial No. 364,064, and in Great Britain May 25, 1928.

This invention relates to joints or connections for pipes, tubes, bars and the like of the union coupling type in which two pipe ends having complementary or interfitting surfaces are united by a securing nut having a flange abutting against a flange on one of the said pipe ends and screwing on to a thread carried by the other.

The invention has for its object to provide an apparatus of this general character in which when the coupling is finally set up the two pipe ends will be capable of relative movement, for example rotary movement about their common axes without opening the joint.

It will be appreciated that with an ordinary coupling of this type when the securing nut is screwed down hard the pipe ends are usually locked together; and if the securing nut is left in such a position that the pipe ends are capable of movement the nut will quickly work loose.

According to the principal feature of the present invention the securing nut is provided with means for positively locking it in an adjusted position (short of the "hard and fast" position) which permits a relative movement of the movement of the pipe ends without opening the joint.

In all cases it is to be understood that the jointing surface between the pipe ends are of such a material that the tightness of the joint may be set to any desired degree consistent with providing the required sealing pressure and at the same time permitting of the required flexibility, that is to say that when the tightening nut is screwed up hard and fast and then slacked back a little the joint is nevertheless capable of providing an effective seal both against pressure from within and pressure from without in case the joint is used in a sub-atmospheric pressure line.

The joint is thus to be distinguished from joints employing a rubber packing in such a manner that unless the nut is screwed up hard, the rubber packing extending across the pipe ends will be liable to be cut by the edges thereof should they be relatively rotated, the space then left between the pipe ends also preventing the joint from satisfactory use in a sub-atmospheric pressure line.

In the preferred form of the invention the union nut which has a partly hexagonal and partly circular outer periphery is provided with a sleeve or collar mounted on the circular portion of its periphery. The wall of the nut is provided with pairs of saw cuts leaving resilient tongues and the outer sleeve is provided with set screws adapted to engage with these tongues to lock the nut in any desired position on the pipe end to which it is screwed.

The invention is illustrated in the accompanying drawings in which

Fig. 1 shows an elevation, and

Fig. 2 a sectional end view on the line II—II of Fig. 3,

Fig. 3 being a transverse section.

Fig. 4 illustrates a transverse section of a modification.

Turning now to the forms illustrated, the first example there shown comprises a pair of pipe ends 1, 2 having complementary or interfitting surfaces 3, 4 adapted to be held together by a securing nut 5 engaging with a flange 6 on pipe end 1 and screwed on a threaded portion 7 of the pipe end 2 in known manner.

According to the invention the threaded portion of the securing nut 5 is provided with pairs of saw cuts 8, leaving resilient tongues, three tongues 9 being so formed in the modification illustrated. Mounted on the cylindrical portion of the securing nut 5 is an external sleeve or collar 10 of solid construction provided with radial set screws 11 spaced correspondingly to the tongues 9. The sleeve or collar 10 may be a loose fit on the securing nut.

One of the engaging surfaces 3, 4 is preferably recessed and packed with joint sealing material 12 of any suitable kind adapted to the use of the fluid or gas for which the joint is intended, the material being preferably slightly resilient. For this purpose I may use for example any usual jointing material such as a mixture of rubber, cork, and asbestos and rubber on a foundation of wire gauze.

In use the joint is assembled in the usual manner and the securing nut 5 preferably first screwed hard and tight. It is then slacked back until the desired amount of rotary movement between the pipe ends 1, 2 is easily possible, whereupon the set screws 11 are tightly screwed up pressing the tongues 9 on the threaded portion of the pipe end 2 and locking the securing nut in the adjusted position. The joint will then permit rotary movement about the common axis between the pipe ends 1, 2, and with many fluids under ordinary pressure, for example petrol delivered from a pump to a tank or vehicle under pressure or gravity, the joint will be satisfactorily fluid tight.

In Fig. 4, I have illustrated a modification in which the interfitting surfaces between the pipe ends 1, 2 are of the nature of a compound spherical joint permitting rocking movement as well as rotary movement. For this purpose the securing nut 5 bears on a flange of the pipe end 1 by means of spherical surfaces, and the pipe ends also interfit by means of spherical surfaces, this construction being generally similar to that of my prior British Patent No. 228,482.

It is to be understood that the invention is not limited to the construction shown and described; for example the saw cuts might be made in planes transverse to the axis of the securing nut and the securing nut itself might be tapped and carry set screws to engage the threaded portion of the pipe end 2, although this latter construction might make it difficult to readjust the securing nut after once it had been set up for example for the purpose of taking up wear, whereas with the constructions illustrated it will be realized that readjustment of the parts is easily possible at any time either to take up wear or for any other purpose.

If desired, I may arrange to provide one or more helical springs between the flange of the securing nut 5 and the flange 6 of the pipe end 1 for the purpose of determining the engaging pressure between the jointing surfaces and providing a certain amount of flexibility in the parts to take up wear automatically.

It will be appreciated that the joint in all cases can be used as a fixed joint if desired. The pipe ends 1, 2 may obviously be screwed either internally or externally or be left plain for brazing.

I claim:—

Union comprising interfitting pipe ends one of said ends being threaded to receive a securing nut said nut and the other of said ends being provided with coacting surfaces, said nut having tongues formed by pairs of slots cut in its threaded wall and carrying a detachable ring holding set-screws to engage said tongues on one of said pipe ends to lock said nut on said threaded end in any position to which it has been adjusted.

In testimony whereof I affix my signature.

JAMES AUGUST McGEORGE.